United States Patent [19]
Sheridan, III

[11] 3,837,482
[45] Sept. 24, 1974

[54] PROCESS FOR PURIFYING CLAY BY SELECTIVE FLOCCULATION

[75] Inventor: John J. Sheridan, III, Somerville, N.J.

[73] Assignee: Engelhard Minerals & Chemicals Corporation, Woodbridge, N.J.

[22] Filed: May 3, 1973

[21] Appl. No.: 356,763

[52] U.S. Cl. ................................................ 209/5
[51] Int. Cl. ............................................. B03d 3/06
[58] Field of Search ................. 209/5, 10; 423/122; 106/72, 288 B

[56] References Cited
UNITED STATES PATENTS

| | | | |
|---|---|---|---|
| 1,847,212 | 3/1932 | Feldenheimer | 209/5 |
| 2,158,987 | 5/1939 | Maloney | 209/5 X |
| 2,981,630 | 4/1967 | Rowland | 209/5 X |
| 3,229,917 | 1/1966 | Miller | 209/5 X |
| 3,410,399 | 1/1968 | Hunter | 209/5 |
| 3,503,499 | 3/1970 | Allegrini | 209/5 |
| 3,539,003 | 11/1970 | Bidwell | 209/5 |
| 3,701,417 | 10/1972 | Mercade | 205/5 |
| 3,737,333 | 6/1973 | Sawyer | 205/5 X |

*Primary Examiner*—Robert Halper
*Attorney, Agent, or Firm*—Melvin C. Flint; Inez L. Moselle

[57] ABSTRACT

An improved method for purifying kaolin clay containing colored impurities by forming a deflocculated aqueous slip of the impure clay and selectively flocculating the clay phase with an anionic polymeric flocculant, such as partially hydrolyzed polyacrylamide. A suspension of the impure clay is rendered strongly alkaline by addition of a soluble hydroxide compound before adding a strong polyanionic clay dispersant such as sodium silicate or sodium condensed phosphate to deflocculate the suspension. Thereafter the pH of the suspension is reduced to a neutral of mildly alkaline value. This is followed by incorporation of the anionic polymeric flocculant which selectively flocculates the clay, leaving the impurities deflocculated.

10 Claims, No Drawings

PROCESS FOR PURIFYING CLAY BY SELECTIVE FLOCCULATION

BACKGROUND OF THE INVENTION

1. Field of the Invention

The term "selective flocculation" refers to a technique for concentrating mixtures of mineral particles into fractions by forming the mixture into an aqueous suspension or pulp and adding a reagent capable of deflocculating the mixture of particles and another reagent capable of flocculating only a desired fraction of the mixture. Usually the pulp is deflocculated before the flocculating agent is incorporated. Anionic organic polyelectrolytes, e.g., partially hydrolyzed polyacrylamide, have been advocated as the agents to bring about the selective flocculation. The usual deflocculating (dispersing) agents are monovalent cation salts of polyanionc acids, e.g., sodium silicate and sodium condensed phosphate salts. Flocculation is believed to occur as a consequence of selective adsorption of the organic polymer on the particles which eventually constitute the flocculated phase.

Selective flocculation of clay from impurities has been suggested as a method for removing indigenous colored impurities, notably discrete colored titania, from clay. However, the potential usefulness of the technique is minimized by the problems involved in obtaining a high recovery of clay with an acceptable removal of colored impurities. The impurities are present in very small quantities and their surface characteristics are quite similar to those of the clay particles. When using selective flocculation to floocculate the clay particles from the colored impurities in a deflocculated aqueous system, the clay particles, especially those of very fine size, tend to remain in deflocculated state or condition. The deflocculated clay particles will report with the impurities. This results in a reduction in the recovery of beneficiated clay. Attempts to maximize removal of colored impurities by increasing the amount of deflocculating agent has a deleterious effect on clay recovery.

The present invention is directed to an improvement in a method for removing discrete colored impurities, especially titania and iron impurities, from impure naturally occurring kaolin clay which involves selectively flocculating clay particles in a deflocculated aqueous slip of the clay by means of a synthetic organic anionic polymeric flocculating agent. An object of the invention is to provide a purification method involving selective flocculation with an organic polymer which results in improved recovery of purified clay as the flocculated phase and also may result in increased removal of colored impurities.

2. Prior Art

Prior art processes which entail the use of polyanionic clay dispersants to deflocculate a pulp of impure clay and organic polyelectrolytes to flocculate selectively the clay particles from impurities are generally characterized by the fact that the deflocculating agent is added to an acidic or neutral suspension of clay, which results in an increase in the alkalinity of the suspension. The pH of the resulting deflocculated suspension is either maintained constant or is further increased before the organic polymeric flocculating agent is incorporated. For example, in U.S. Pat. No. 3,447,809 to Bundy et al., a slip of impure kaolin clay is dispersed with a sodium condensed phosphate salt and the pH is increased to 8.0 or 8.3 by addition of ammonia before incorporating a polyacrylamide flocculant to flocculate clay impurities. Similar practice is described in Rowland U.S. Pat. No. 2,981,630 wherein clay is separated into clay fractions of different viscosity characteristics by means of the selective adsorption of an organic polymer on the fraction to be flocculated. In U.S. Pat. No. 3,539,003 to Bidwell, clay is separated from quartz by adding a dispersant to a slip of the impure clay, then adding alkali to a pH above 8, preferably 10 to 12, followed by addition of the polymer at the high pH. To the best of my knowledge, the only prior process which may involve a reduction in pH between additions of polyanionic deflocculating agent and organic anionic flocculating agent is described in U.S. Pat. No. 3,701,417 to Mercade. In this process, however, the impurities, not the clay particles, are selectively flocculated. In common with the aforementioned selective flocculation techniques, the deflocculating agent is added at the natural pH of the impure clay, whereby an increase in pH results when the deflocculating agent is added.

THE INVENTION

Based upon the theoretical concept that positive sites on the edges of kaolin clay crystals are the adsorption sites for anionic polymer attachment necessary for flocculation of the clay particles from a previously deflocculated aqueous clay suspension, I have invented a novel technique for improving the selective flocculation of clay particles from colored titaniferous and ferruginous impurities. My process represents a departure from prior art practice and has resulted in an increase of great magnitude in the recovery of kaolin clay obtainable by selective flocculation of clay with an organic anionic polymer. An unexpected benefit has been the improvement in the clay purity and brightness which is also realized.

The essence of my invention resides in rendering an aqueous pulp of impure kaolin clay highly alkaline by adding a soluble hydroxide, preferably alkali metal hydroxide, before incorporating a polyanionic clay deflocculating agent, and reducing the pH of the resulting highly alkaline deflocculated pulp of impure clay to a neutral or mildly alkaline value before adding a synthetic organic anionic polymeric flocculating agent, preferably a weakly anionic flocculating agent such as partially hydrolyzed polyacrylamide. Addition of the organic polymer results in the selective flocculation of the clay particles, leaving a concentrate of the impurities deflocculated. The flocced purified clay is then separated from the deflocculated impurities. Stated in another manner, the improved selective flocculation process of the present invention comprises the steps of providing an aqueous pulp of impure clay which is substantially free from strong clay dispersants which are polyanionic in nature, adding a soluble hydroxide to the clay pulp in amount sufficient to render the pulp highly alkaline, thereafter adding a polyanionic clay dispersant to deflocculate all of the minerals in the pulp, reducing pH to a neutral or mildly alkaline value, incorporating a synthetic organic polyanionic flocculating agent and separating the flocced purified clay particles from the deflocculated concentrate of impurities.

The pH to which the pulp is reduced before adding the organic polymer will depend upon whether colored titania alone or both titania and iron impurities are to be removed. pH values in the range of 7.0 to 8.8 can be used to remove titania. However, to remove iron impurities along with titania, pH should be slightly above 8.5.

It is postulated that the improved clay recovery that is realized by practice of my invention results from the prevention or minimization of undesirable absorption of dispersant on clay particles which, if adsorbed, would stabilize the clay particles and prevent adsorption of organic polymer, as required for flocculation to take place. It is theorized that the hydroxyl ions added before polyanionic dispersant become strongly but reversible adsorbed on positively charged edges of the kaolinite crystals. This prevents or minimizes subsequent adsorption of the polyanionic dispersant. When pH is reduced after dispersant is added, also in accordance with the invention, hydroxyl ions desorb from the clay particles. The clay particles are then amenable to adsorption of the flocculant. The dispersant is not desorbed from the particles of the impurities because of the strong bonds existing between the polyanions of the dispersant and the particles of the impurities.

DESCRIPTION OF THE INVENTION

The process of the invention is applicable to clay crudes which have undergone no pretreatment, as well as to clays partially refined by degritting, particle size fractionation, etc. It is important to use clay which is free from polyanionic clay dispersants. Mild clay dispersants which are not polyanionic, such as soda ash, alkali metal hydroxide, ammonium hydroxide and combinations thereof may be present with the clay. Conventional sedimentary soft (so-called "white") Georgia kaolin clays of the type used as sources for quality paper coating pigments are recommended. When processing hard (ultrafine) clays, e.g., the gray Georgia kaolins, the process should be modified to include an aging period of 24 hours or greater after adding the polyanionic dispersant.

In one preferred embodiment of the invention, described in detail in the illustrative examples, degritted but unfractionated kaolin clay crude is purified by the selective flocculation process of the present invention. This results in a pulp of purified unfractionated (so-called "whole" clay) which is then redispersed in conventional manner and separated by hydraulic classification such as sedimentation or centrifugation into a purified fine particle size fraction (e.g., 80 percent or more finer than 2 microns). This fine size fraction of purified kaolin clay is bleached to provide a white fine particle size clay pigment suitable for use as a paper coating pigment. The remaining purified coarse size fraction of purified clay may be bleached, if desired, and used as a paper filler. Alternatively the coarse size fraction may be further processed to provide a delaminated clay pigment. This technique results in an outstanding recovery of the fine size fraction of purified clay and simultaneously provides a beneficiated coarse size fraction of clay.

In another preferred embodiment of the invention, a clay crude pulp is degritted and fractionated. A fine size fraction which is thereby produced is subjected to the selective flocculation process of the present invention. The degritting and fractionation step, however, are carried out with a clay pulp which is brought to a highly alkaline pH by incorporating a soluble hydroxide without adding a polyanionic clay deflocculating agent. The polyanionic clay deflocculating agent is incorporated with the clay after the degritting and fractionation steps have taken place. This is done, in accordance with the principles of the invention, to prevent adsorption of the polyanionic deflocculating agent on the clay particles to be flocculated.

In putting my invention into practice, clay pulps or suspensions of varying clay concentrations may be employed. For example, the pulps may be as dilute as 5 percent clay solids (weight basis) or as concentrated as 40 percent solids provided the system is in highly fluid state or condition after the deflocculating polyanionic clay agent has been added. For economic reasons it is preferable to employ clay solids above 10 percent. Especially recommended are pulps at about 20 percent solids.

To render the clay pulp strongly alkaline, e.g., a pH in the range between 9.5 and 11.5, as required in practicing my invention, any soluble hydroxide compound may be used. Alkali metal hydroxides, e.g., sodium hydroxide, lithium hydroxide and potassium hydroxide, are strongly preferred to alkaline earth hydroxides because alkaline earth metal ions may tend to flocculate the impurities, thereby impairing the efficiency of separation from clay. Ammonium hydroxide will not produce the desired high pH. pH values above 11.5 are to be avoided because clay flocculation will occur. Preferred are pH values in the range of 10.0 to 10.5. Certain polyanionic clay deflocculating agents, e.g., alkali metal silicates, are strongly alkaline and, when used in sufficient quantity, can render clay pulps strongly alkaline. I wish to emphasize the fact that use of such strongly alkaline polyanionic dispersants to impart the required pH to the clay pulp is outside the scope of the invention. Such practice will not result in the high clay recovery realized by practice of my invention. My invention requires introduction of polyanionic clay deflocculating agent to clay previously made highly alkaline by a soluble hydroxide in the absence of polyanions.

The highly alkaline pulp may be deflocculated with any common clay dispersant, all of which are monovalent cation salts of polyanionic acids. Examples of such dispersants are: soluble silicates such as sodium silicates and potassium silicates; condensed phosphate salts, such as sodium hexametaphosphate and tetrasodium pyrophosphate; sodium lignosulfonate; and sodium polyacrylate of molecular weight below about 2,000. Alakli metal silicates, especially potassium silicates, are preferred.

The dispersant is used in amount to provide a well-deflocculated fluid slip. The amount of dispersant varies, inter alia, with the solids of the system and with the nature of the clay being processed, especially the particle size distribution of the clay, Generally, dispersant is added in amount within the range of 2 to 10 lbs./ton of clay. Excessive use of dispersant results in flocculation of the clay and is obviously to be avoided.

Any acid or acid salt may be employed to decrease the pH of the deflocculated pulp to a value in the range of about 7.0 to 8.8, depending upon whether titania alone or titania and discrete iron oxide impurities are to be removed. Preferably a mineral acid is used. Sulfuric acid is especially recommended. Acid salts such as alum introduce cations which may upset the balance of charges on the particles in the system.

Flocculation of impurities during the acidification step is prevented by providing a pH which is above the value corresponding to the zero point charge of the mineral impurity to be removed which has the highest zero point charge. In the case of titania, this pH is about 6.5; in the case of iron oxide, pH is about 8.5. Thus, when separation of both titaniferous particles and ferruginous particles is desired, the pH should be reduced to a value slightly above 8.5, e.g., to pH 8.7. On the other hand, when removal of titania alone is desired, the pH may be lower. The term "zero point charge" as used herein refers to the pH value at which a mineral in aqueous suspension possesses a net zero charge over its surface. This is determined in conventional manner with a zeto potential meter and corresponds to a condition of zero electrophoretic mobility of the mineral. In other words, it represents the pH at which there will be no net motion of the mineral species in either direction in the presence of anodic and cathodic electrodes.

The organic polymers useful in carrying out the invention are water-soluble anionic organic polyelectrolytes having an average molecular weight greater than 10,000. The term "anionic organic polyelectrolyte" as used herein encompasses synthetic organic polymers which, when placed in an aqueous medium, ionize on the polymer molecule into a substantial number of anionic groups distributed at a plurality of positions on the molecule. Weakly anionic polymers are preferred. Weakly anionic polymers contain both anionic and nonionic groups. Anionic properties are imparted to synthetic organic polymers by the presence of side chains of carboxylic acid, carboxylic anhydride and carboxylic acid salt groups. Nonionic groups in a side chain in the polymer result from the presence of one or more of the following hydrophilic groups: carboxylic acid amide, carboxy alkyl ester, pyrrolidone, hydroxy, hydroxy alkyl ether and alkoxy. Especially preferred because of their commercial availability are high molecular weight weakly anionic synthetic polyacrylamides containing some replacement of amide by carboxylic groups. Such polyelectrolytes are prepared by copolymerization of acrylamide and acrylic acid or by the partial hydrolysis of polyacrylamide. Reference is made to "POLYELECTROLYTE ADSORPTION OF KAOLINITE," A. S. Michaels and O. Morelos, INDUSTRIAL AND ENGINEERING CHEMISTRY, Volume 47, No. 9, page 1,802, for a detailed description of a method for synthesizing hydrolyzed polyacrylamide (PAM) and for controlling the extent of partial alkaline hydrolysis.

The organic polymer is preferably added as a highly dilute solution, for example, an aqueous solution of 0.01 percent to 0.1 percent weight concentration. Extremely small amounts of polymer are used, e.g., from ⅛ to ½ lb. per ton of clay. When insufficient polymer is used, flocculation is inadequate or, in an extreme case, no flocculation occurs. An excess of flocculant may result in indiscriminate flocculation of all of the solids.

Mild or vigorous agitation may follow addition of flocculant. In some cases, stagewise addition of the polymeric flocculant will be beneficial. After the flocculant has been mixed into the pulp, the pulp should be maintained sufficiently quiescent for flocs to form and consolidate.

The clay flocs can be separated from the deflocculated impurities by conventional means such as decantation, siphoning or centrifuging.

The flocculated purified clay may be further cleaned by diluting the pulp, adding more flocculant and separating remaining deflocculated impurities with additional polymeric flocculant and recovering the flocculated clay.

The following examples are given to illustrate practice of the invention and to demonstrate benefits realized by such practice. In the example, all proportions are reported on a weight basis. Clay weight is reported on a dry weight basis. Brightness values represent those obtained by TAPPI Standard Method T–646 m–54, described in TAPPI, October 1950, pages 159–160A. All particle sizes in the micron size range refer to values obtained by the Casagrande sedimentation method.

EXAMPLE I

The starting clay used in the example was a sample of sedimentary kaolin clay crude from Washington County, Georgia. This crude is typical of the soft so-called "white" crudes which are wet processed on a commercial basis to produce No. 1 and No. 2 grades of coating clay. Although classified as "white" crudes to distinguish from the gray, hard crudes also mined in the area, the crude clay used in the example had a distinctly yellowish color and contained discrete titania and iron oxide impurities. A minus 325 mesh fraction of the crude had an unbleached brightness of 79.3 percent. The objective of the selective flocculation tests hereinafter described was to produce a coating clay pigment having acceptable brightness, preferably over 88 percent, at the highest possible clay recovery.

A sample of the impure crushed crude clay was prepared into a 37.9 percent solids degritted slip as follows. The dry clay was blunged in conventional manner in deionized water to produce a slurry having a pH of 4.5. To render the slurry sufficiently fluid for grit removal, sodium hydroxide was added as a 5 percent solution to pH 5.6, followed by agitation for 10 minutes and addition of a 5 percent solution of sodium carbonate in amount corresponding to 4 lbs./ton clay, followed by agitation for 30 minutes. The slurry was then passed through a 325 mesh (44 micron) screen and the minus 325 mesh portion was recovered. The minus 325 mesh slurry was diluted to 20 percent solids with deionized water.

In accordance with the present invention, sufficient sodium hydroxide (5 percent solution) was added to the 20 percent solids slurry to increase pH to 10.0. This was done for the purpose of facilitating adsorption of hydroxyl ions onto the positively charged kaolin edges before silicate ions in the dispersant could be adsorbed on these sites. To the strongly alkaline suspension "O" sodium silicate solution (9.16 percent $Na_2O$, 29.5 percent $SiO_2$) was added in amount of 3 lbs. "O" per ton clay while the suspension was agitated at high speed with an impeller agitator. After addition of the dispersant, agitation was continued for 5 minutes. Addition of the sodium silicate resulted in a perceptible increase in the fluidity of the suspension. The pH after addition of the sodium silicate was 10.1. Immediately after agitating the suspension containing the sodium silicate, the pH was reduced to 8.7, in accordance with the invention, by adding a 5 percent solution of sulfuric acid. The objective was to desorb previously adsorbed hydroxyl ions from positively charged edges on the clay crystals, making the clay particles amenable to adsorption of an anionic polymer while maintaining pH at a value above the zero point charge of the titania and iron impurities.

The polymeric flocculant used to flocculate the clay was "Polyhall M–59," partially hydrolyzed polyacrylamide reported by the suppliers to have a molecular weight between 3 to 5 million and to be weakly anionic. The "M–59" was diluted with water to 0.01 percent (weight) and the freshly diluted polymer was added to the mildly alkaline deflocculated suspension of impure clay while the suspension was being mildly agitated. The polymer was added in amount of 0.01 percent of the clay weight (corresponding to 0.2 lb. polyacrylamide per ton of dry clay).

Immediately after addition of the polymer, flocculation could be observed. To assure more full flocculation of the clay particles, the slurry was mildly agitated for 15 minutes. Agitation was discontinued and the slip was allowed to stand under quiescent conditions for 15 minutes. This resulted in the separation of the slurry into two distinct phases — a lower, white flocculated phase and an upper brownish-yellow deflocculated suspension. The fluid suspension of colored particles (overflow) was removed from the flocced clay (underflow) by means of a siphon. The flocculated suspension of partially purified kaolin clay was then diluted to about 20 percent solids by addition of 1,500 ml. of deionized water and the system was agitated for 15 minutes. Agitation was stopped and a 0.01 percent solution of "M–59" was added in amount of 0.2 lb./ton. The slurry was mildly agitated for 15 minutes and allowed to settle for 15 minutes. The colored upper layer (overflow) was removed from the cleaned flocculated clay product (underflow) by siphoning and combined with the overflow from the first purification step.

The underflow (flocculated purified clay) and combined overflows (concentration of colored impurities) were dried and weighed. Brightness of a paper coating fraction of the purified clay was evaluated by preparing a 5 percent solids dispersion of the underflow and allowing the clay to settle under conditions calculated to result in a minus 3 micron (equivalent spherical diameter) fraction as a suspension. A portion of the minus 3 micron fraction was flocced with sulfuric acid to pH 2.5 and bleached in conventional manner with zinc hydrosulfite (18 lbs./ton).

For purposes of comparison, a control test was carried out without adding a strong base to the degritted slurry before dispersing the slurry with sodium silicate and flocculating the clay fraction with the partially hydrolyzed polyacrylamide. In conducting the control test, another portion of the 37.9 percent solids minus 325 mesh slip of impure clay was diluted to 20 percent solids, as in the experimental text, and pH was adjusted to 8.7 with 5 percent sulfuric acid before "O" sodium silicate was then added in amount of 3 lbs./ton. The pH was immediately readjusted to 8.7. The procedures used in the experimental test were repeated.

Using the process of the invention, 83 percent by weight of the minus 325 mesh starting clay was recovered as a purified clay (underflow) product and the minus 3 micron fraction of this produce had a brightness of 89.1 percent after being bleached. In contrast, in the control test only 46 percent by weight of the starting clay was recovered and the minus 3 micron fraction of this clay had a bleached brightness of 86.4 percent. A comparison of these results shows that 37 percent more clay was recovered when practicing the invention and that the coating fraction of the beneficiated clay was 2.7 points brighter.

Assays of the starting clay and products obtained by carrying out the process of the invention were obtained. The values are summarized in table form.

Data in the table show that the starting clay assayed 1.53 percent $TiO_2$ and 0.48 percent $Fe_2O_3$ whereas the concentrate of impurities (overflow) contained 5.21 percent $TiO_2$ and 0.77 percent $Fe_2O_3$. Thus, there was almost a fourfold concentration of titania and almost a twofold concentration of iron. This concentration of impurities resulted in a substantial reduction of titania impurities in the purified clay underflow (1.16 percent $TiO_2$ in the minus 3 micron fraction and 1.04 percent $TiO_2$ in the plus 3 micron fraction) and a reduction of iron in the plus 3 micron (0.36 percent $Fe_2O_3$).

Calculations of distribution of the impurities made from assays and weight of products are also reported in the table. These values show that 17 percent of the iron and 38 percent of the titania impurities reported in the concentrate of impurities. The remaining titania was evenly distributed between the fine and coarse size fraction of the flocculated purified clay. The remaining iron was distributed between these fractions but was more concentrated in the fine size fraction.

This example therefore shows that the process of the invention provides a means for removing both titania and iron impurities from an unfractionated clay with relatively low losses of clay and that purified fine and coarse size fractions of clay may be obtained from the purified clay.

PURIFICATION OF KAOLIN CLAY BY SELECTIVE FLOCCULATION OF CLAY
FROM IMPURITIES - PROCESS OF THE INVENTION
EXAMPLE I

| Product | Wt. % | Impurities | | | |
|---|---|---|---|---|---|
| | | Assay, Wt. Percent | | Distribution of Impurity, * Wt. Percent | |
| | | $TiO_2$ | $Fe_2O_3$ | $TiO_2$ | $Fe_2O_3$ |
| Starting (minus 325 mesh) clay | 100 | 1.53 | 0.48 | 100 | 100 |
| Underflow | | | | | |
|   Flocculated purified clay | 83 | | | | |
|     −3 micron fraction | 47 | 1.16 | 0.47 | 32 | 47 |
|     +3 micron fraction | 36 | 1.04 | 0.36 | 30 | 36 |
| Overflow | | | | | |
|   Deflocculated concentrate of impurities | 17 | 5.21 | 0.77 | 38 | 17 |

* = calculated

EXAMPLE II

In another illustrative example of the practice of my invention, the general procedure of the previous example was followed with a mixture of soft Georgia kaolin crudes. The starting clay (minus 325 mesh portion) had a brightness of about 76 percent. In this test, potassium hydroxide (5 percent solution) was used to adjust pH to 10.0 before adding dispersant (Kasil No. 1, which analyzes 8.30 percent $K_2O$ and 20.80 percent $SiO_2$). After addition of the "Kasil," pH decreased to 9.9. As in Example I, pH was decreased to 8.7 by addition of sulfuric acid after the alkali metal silicate had been incorporated into the alkaline slurry of impure clay. The procedure was also varied by adding the "M–59" in three stages, using 0.2 lb./ton in each stage. The flocculated clay was diluted and cleaned by treatment with an additional 0.2 lb./ton "M–59," as in Example I. The cleaned flocculated clay was further cleaned by diluting the underflow from the cleaner with water, adding a small amount of tetrasodium pyrophosphate, agitating the suspension and removing suspended solids.

In this test, there was a 90 percent recovery of beneficiated clay. The minus 3 micron fraction of the beneficiated clay had a brightness of 88.3 percent after being acidified to pH 3, with sulfuric acid, aging for a day and then bleaching with 2 lbs./ton potassium permanganate and 15 lbs. zinc hydrosulfite.

I claim:

1. In a process for removing colored titaniferous impurities or a mixture of titaniferous and ferruginous impurities from kaolin clay wherein an aqueous suspension of the impure clay is deflocculated by addition of an alkali metal silicate and thereafter the clay particles are selectively flocculated by addition of a synthetic organic polyanionic flocculating agent which is a weakly anionic partially hydrolyzed polyacrylamide and a concentrate of deflocculated impurities is separated from flocculated purified clay, the improvement which comprises adjusting the pH of said aqueous suspension of clay to a ph value in the range of 9.5 to 11.5 by adding a alkali metal hydroxide before adding said alkali metal silicate and, after adding said alkali metal silicate and before adding said flocculating agent, reducing the pH of the suspension to a pH value within the range of 7.0 to 8.8.

2. The process of claim 1 wherein said alkali metal silicate is potassium silicate.

3. A process for producing a purified fine size coating grade clay pigment and a purified coarse size filler grade clay product from an impure sedimentary soft kaolin crude which contains colored titaniferous impurities which comprises forming a fluid alkaline suspension of the crude clay without incorporating a polyanionic clay dispersing agent, removing grit from the suspension by sedimentation, increasing the pH of said suspension to a value in the range of about 9.5 to 11.5 by adding an alkali metal hydroxide compound unless the pH of the slip is already in said range, thereafter adding a polyanionic clay dispersing agent, reducing the pH of the suspension to a value in the range of 7.0 to 8.8 by adding a mineral acid, incorporating a synthetic organic weakly anionic partially hydrolyzed polyacrylamide flocculating agent, whereby clay particles are flocculated and impurities remain dispersed, separating the flocculated clay from the impurities, redispersing the flocculated clay, subjecting the redispersed flocculated clay to a hydraulic classification so as to separate the clay into a fine size coating clay fraction and a coarser size filler grade fraction and bleaching said fine size fraction of clay.

4. The process of claim 3 wherein said polyanionic clay dispersing agent is potassium silicate.

5. The process of claim 3 wherein said pH after addition of said alkali metal hydroxide is in the range of 10.0 to 10.5.

6. A process for producing a purified fine size coating grade pigment from an impure sedimentary soft kaolin crude which contains colored titaniferous impurities which comprises providing an aqueous pulp of the impure clay, without adding a polyanionic clay dispersing agent, adjusting the pH of said pulp to a value in the range of 9.5 to 11.5 by incorporating an alkali metal hydroxide, subjecting the alkaline pulp to hydraulic classification by sedimentation or centrifugation to recover a fine size fraction of clay in the form of an aqueous suspension, incorporating a polyanionic clay dispersing agent to defloculate said suspension, decreasing pH to a value in the range of 7.0 to 8.8 by adding an acid, incorporating a synthetic organic weakly anionic partially hydrolyzed polyacrylamide as a flocculating agent, whereby clay particles are flocculated and impurities remain dispersed, separating the flocculated clay from the impurities, and bleaching the flocculated clay.

7. The process of claim 6 wherein said polyanionic clay dispersing agent is potassium silicate.

8. The process of claim 6 wherein said alkali metal hydroxide is sodium hydroxide and said polyanionic clay dispersing agent is potassium silicate.

9. The process of claim 6 wherein said pH after addition of said alkali hydroxide is in the range of 10.0 to 10.5.

10. The process of claim 6 wherein said clay contains a discrete iron oxide impurity and the pH of the pulp is reduced to a value above 8.5 by addition of said acid.

* * * * *